April 1, 1969

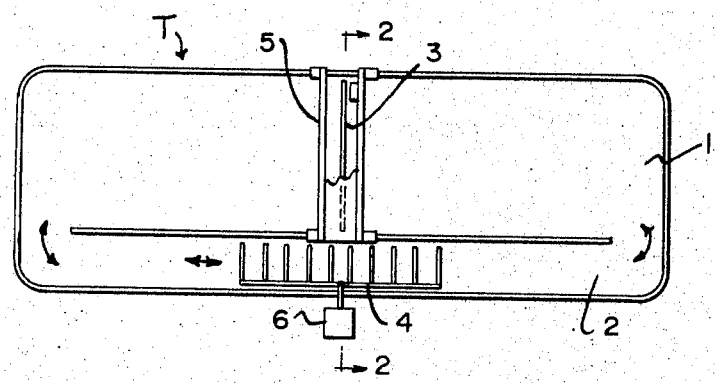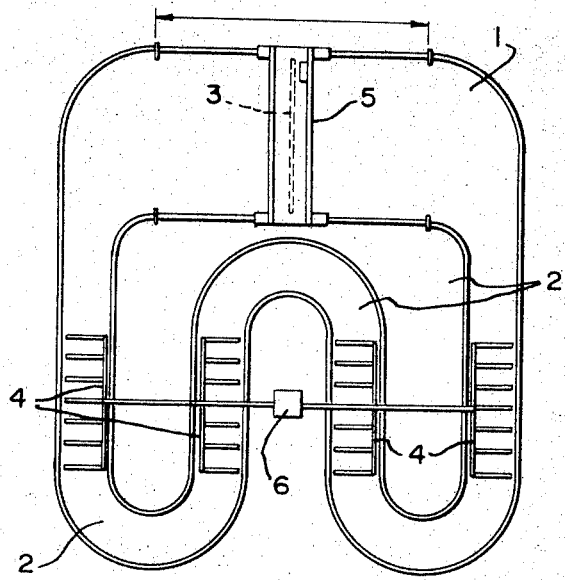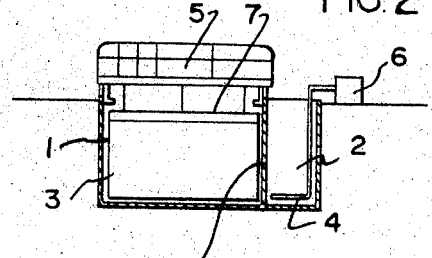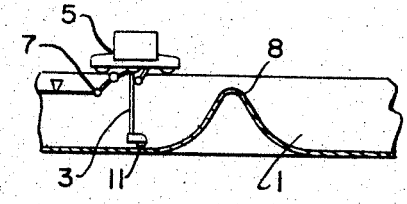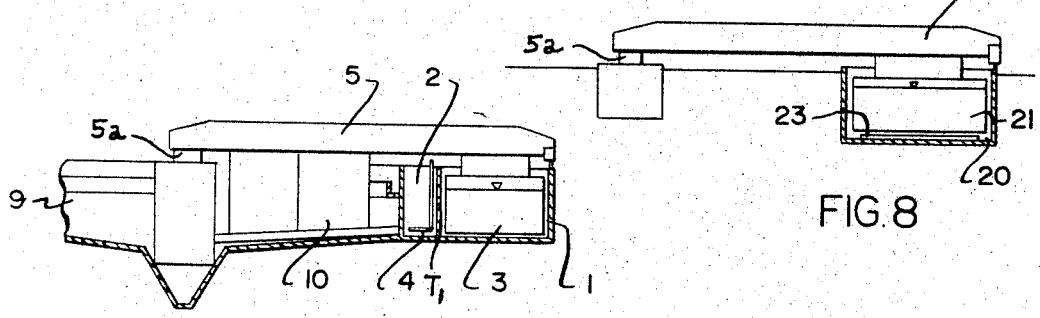

W. F. OHL ET AL 3,435,954

WASTE WATER PURIFICATION APPARATUS

Filed March 8, 1967

INVENTORS
WERNER F. OHL
RUDOLF C. PASSAVANT

BY Petherbridge, O'Neill & Aubel

ATTORNEYS.

United States Patent Office 3,435,954
Patented Apr. 1, 1969

3,435,954
WASTE WATER PURIFICATION APPARATUS
Werner Friedrich Ohl, Michelbach, and Rudolf Christian Passavant, Michelbacherhutte, Germany, assignors to Passavant-Werke, near Michelbach, Nassau, Germany, a corporation of Germany
Filed Mar. 8, 1967, Ser. No. 621,923
Claims priority, application Germany, Mar. 8, 1966, P 38,924
Int. Cl. C02c
U.S. Cl. 210—220                                6 Claims

ABSTRACT OF THE DISCLOSURE

Apparatus for introduction of gases into liquids such as aeration of activated sludge wherein a tank includes aeration devices and a movable fluid circulation blade disposed vertically and transversely of the tank and of substantially the same cross-sectional area as the tank. The tank may be rectangular with the blade reciprocating or circular with the blade rotating and preferably with the aeration devices being located in the bottom of the tank. The tank may be separated into a fluid circulation section and an aeration section by a common wall in fluid flow communication, with the blade being located in the circulation section and the aeration devices being located in the aeration section.

---

This invention relates to apparatus for the introduction of gases into fluids and is more particularly directed to apparatus for treating sewage and the like to enhance oxygen distribution in a fluid carrier, such as the aeration step required in the activated sludge treatment process.

Heretofore, it has been known that gas absorption in fluids may be enhanced by locating gas outlets throughout the bottom of the fluid tank so that the gas rises vertically throughout the entire fluid volume and by flowing the fluid in a horizontal path across the vertical path of movement of the gas. Prior attempts in the art to produce aeration apparatus for use, for example, in treatment of activated sludge, to accomplish such liquid-gas flow patterns to aerate the sludge have included tanks with oxygen outlets located in the bottom of the tank and with fluid circulation devices, such as rotatable paddles, submerged screws and bladed aeration rotors, for causing horizontal water flow patterns in the fluid in the tank above the oxygen outlets. Generally, these fluid circulation devices have either been inadequate to create the required horizontal flow patterns or have been uneconomical. For example, rotatable paddles or bladed aeration rotors located adjacent the upper surface of the fluid in the tank must be operated at high velocities in order to produce adequate horizontal flow patterns across the oxygen outlets located in the bottom of the tank. To produce such high flow velocities from a location at the upper surface of the tank require large uneconomical power expenditures. In addition, such high flow velocities at the upper surface of the tank may develop undesirable whirl flow patterns, whereby flow at the bottom of the tank is not achieved, and, indeed, even undesirable back flow patterns may develop. Such undesirable flow patterns may result in settling of the sludge causing thereby clogging of one or more of the plurality of oxygen aeration outlets located in the bottom of the tank. Moreover, use of fluid circulation devices which are submerged, such as submerged screws, also does not result in a uniform horizontal flow pattern across the bottom of the tank and also presents the aforementioned problems of sludge deposits clogging of the aeration outlets.

It has also been attempted in the prior art to use reciprocating carriages travelling above the water level in rectangular activated sludge aeration channels. These carriages carry baffle plates which extend a short distance below the upper surface of the fluid and extend across the width of the channel. In addition, the carriage carries a plurality of aeration devices which are disposed in the fluid in the channel. However, this apparatus will introduce oxygen only into a portion of the fluid in the channel and will circulate only a portion of the fluid in the channel, thereby encouraging sludge deposits and minimizing contact between the activated sludge and the oxygen. In addition, a high travelling speed of the carriage is required, with the velocity of the fluid passing over the aeration elements being substantially greater than the rate of the travelling speed of the carriage. The acceleration and deceleration of the reciprocal motion of the carriage at the required high rates of speed produce an uneconomical demand on the power supply. Even use of baffles of this apparatus submerged only a short distance in the channel with aeration outlets located in the bottom of the channel would also be uneconomical in that the flow velocity produced by such baffles would be too low to effectively mix oxygen with the liquid unless the baffles were moved at high velocities. Moreover, with the prior art travelling carriage type devices, only a small number of aeration devices could be carried by the carriage, so that aeration is actually confined to particular areas of the channel adjacent the upper surface of the fluid during movement of the carriage. Furthermore desirable flocks developed in the tank are subject to being broken up with the prior art devices.

With the present invention, the above-mentioned problems and difficulties of the prior art, among others, are substantially overcome by the provision of a movable blade which extends vertically into and transversely across the body of fluid in a fluid channel and is of substantially the same cross sectional area as the cross sectional area of the fluid in the channel. With the construction of the present invention, the vertically and transversely extending blade is movable along the length of the channel to move the body of fluid located in front of the blade and thereby cause desirable horizontal flow patterns at the bottom of the channel where are located a plurality of aeration devices. With this arrangement, the total contents of the fluid channel may be circulated; aeration devices may be mounted on the bottom of the tank; flocks are not destroyed to any substantial extent; contact between oxygen and active sludge may be continuously maintained; horizontal flow of liquid across the flow path of air flowing from the aeration devices is maintained; the blade may move at relatively low speeds whereby the blade may be operated with minimum power elements; the apparatus may be constructed so that the liquid channel may be either of rectangular shape or circular shape; and the blade may be disposed for movement in one section of an activated sludge aeration tank and the aeration devices may be located in another section of the tank.

It is, therefore, an object of the present invention to provide new and improved apparatus for introduction of gases into fluids.

Another object of the present invention to provide new and improved apparatus for enhancing oxygenation of activiated sludge in a confined space.

Still another object of the present invention is to provide new and improved devices including a vertically and transversely extending blade disposed in an activated sludge tank, which blade is of substantially the same cross sectional area as the tank and which is movable in the tank to circulate the entire body of fluid in the tank in a substantially horizontal direction with aeration devices located in the tank preferably in or adjacent the bottom thereof.

These and other objects, features and advantages of the present invention will become readily apparent from a careful consideration of the following detailed description, when read in conjunction with the accompanying drawing illustrating various embodiments of the present invention and wherein:

FIG. 1 is a top plan view of apparatus constructed in accordance with the present invention and partially broken to facilitate description;

FIG. 2 is a view in section taken substantially along line 2—2 of FIG. 1;

FIG. 3 is a top plan view of a modification of the apparatus shown in FIGS. 1 and 2;

FIG. 5 is a view in section taken along 5—5 of FIG. 4 and partially broken to facilitate description;

FIG. 6 is a view taken along line 6—6 of FIG. 4 illustrating particular features of the apparatus of FIG. 4;

FIG. 8 is a view in partial section of FIG. 7.

Figure 4:
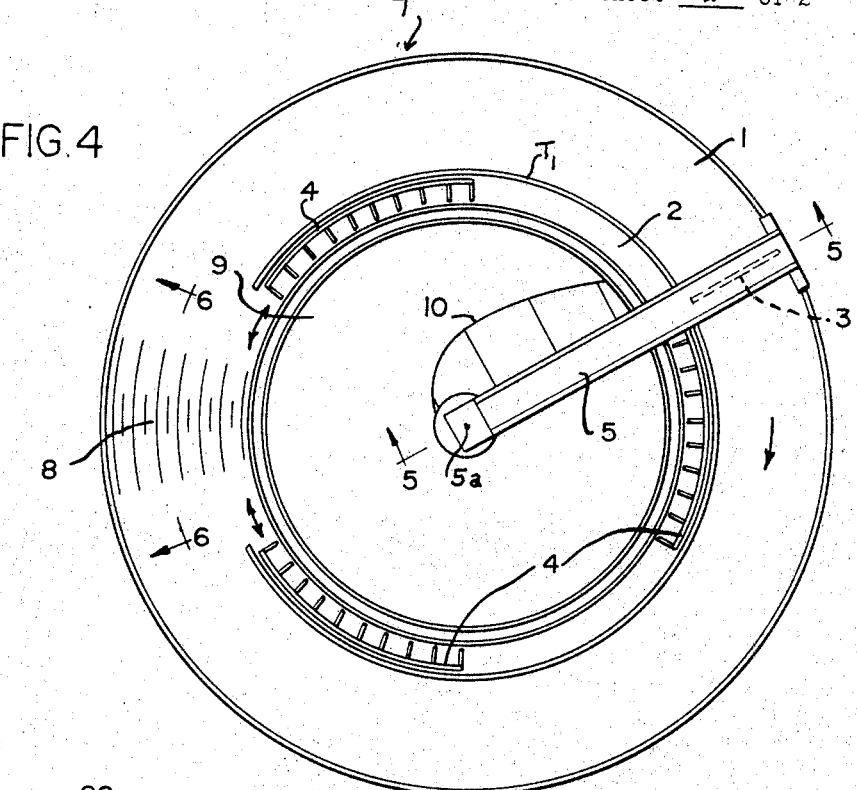
FIG. 4 is a top plan view of a third modification of the present invention.

Referring to FIGURES 1 and 2, there is disclosed apparatus adapted for the treatment of activated sludge and including a rectangular tank T defined by four adjoining walls and separated by an internal wall $T_1$ into a fluid circulation section 1, a vertically and transversely extending blade 3 is disposed in the body of fluid in the circulation section 1 of the tank. As clearly shown in FIG. 2, the blade 3 is a plate rectangular shape, is of rigid construction, and is of substantially the same cross sectional area as the circulation section 1. It is noted that the wall $T_1$ is open at opposite ends to permit fluid circulation between the circulating section 1 and the aeration section 2.

The blade 3 is carried for reciprocal movement to the left and right as viewed in FIG. 1, by a carriage assembly 5 which rides above the body of fluid in the tank T on the wall $T_1$ and on the opposite parallel wall of the tank T as appears in FIG. 1. Reciprocal movement of the carriage and blade at predetermined speeds produces horizontal liquid flow patterns in both the circulation section 1 and in the aeration section 2, because these sections are in fluid flow communication through the openings defined by wall $T_1$ as indicated by the arrows in FIG. 1. Moreover, because the circulation section 1 has a substantially greater width dimension than the aeration section 2, the fluid in the aeration section 2 flows with a flow velocity which substantially exceeds the flow velocity of the fluid in the circulation section 1 and the actual travelling velocity of the blade 3 and carriage 5. This arrangement of channel sections assures continuous circulation of the total volume of fluid in the tank by the blade 3 through the two sections 1 and 2 and permits dimensioning of the circulation section 1 so that it may be of substantially greater value than the aerating section 2. For example, the circulation section can be 2 to 4 times as large as the aeration section.

With the arrangement of circulation section 1 and aeration section 2 of FIG. 1 a plurality of conventional aeration devices 4 may be disposed in the aeration section 2 and provided with compressed air through a compressed air compressor 6. The arrangement and number of the aeration devices 4 used, and preferably located in the bottom of the tank area section 2, may be chosen as required. With this arrangement, the blade 3 does not travel directly over the aeration devices 4, and the horizontal fluid flow over the aeration devices 4 in section 2 is greater than the velocity of movement of the carriage 5, thereby minimizing the power demands for the carriage when compared to the power demands of prior art devices.

If desired, of course, the bottom of the circulation section 1 may also be furnished with aeration devices located throughout its length and width. However, it has been found that with aeration elements 4 located only in the aeration section 2, as shown in FIGS. 1 and 2, adequate circulation of the total fluid contents of the tank results, with enhanced aeration sufficient to handle aeration of the sludge normally found in activated sludge tanks.

Satisfactory aeration results have been obtained with tanks so proportioned when the flow rate of the fluid in the aeration section is maintained at least 0.3 m./sec. and preferably this flow rate is within the range of about 0.5 to about 1.5 m./sec. The speed of the blade 3 may then be maintained at lower speed rates, preferably within the range of about 0.1 to about 0.5 m./sec. Friction losses are relatively small as are the accelerating and retarding losses experienced by reciprocation of the blade 3.

It will be appreciated that apparatus constructed in accordance with the present invention wherein the circulation section is a rectangular tank and the aeration section is a rectangular tank results in a space-saving arrangement. It will also be appreciated that the aeration section particularly may be closed on the top to minimize escape and loss of oxygen or gas thereby prolonging the residence time of the oxygen in the aeration section and enhancing contact between the gas and fluid. If desired, the circulation section may also be closed on top.

In the arrangement illustrated in FIG. 3, the aeration section 2 may be in a serpentine shape and in flow communication at both ends with the circulation section 1. Aeration elements 4 may be disposed in various parts of the aeration section 2 and supplied compressed air from a common supply source 6. It is noted that the same volume relationship and area relationships between circulation section 1 and aeration section 2 of the embodiment of FIG. 3 are preferably in the same relationships mentioned in connection with the FIG. 1 embodiment to result in horizontal fluid flow patterns over the aeration elements.

In order to minimize the power losses and effects of flow patterns which may result from the arrangements of FIGURES 1 to 3, the arrangements of FIGURES 4 through 8 may be employed.

In FIGURES 4 and 6, there is disclosed a circular tank wherein the circulation section 1 and aeration section 2 are arranged in circular and concentric relationship. The aeration section, it is noted, is located inwardly of the circulation section. With this arrangement, the blade 3 may be mounted on a carriage 5 pivoted at 5a for continuous 360° rotation of the blade 3 in the circulation chamber 1. The separation wall $T_1$ is also circular and is common with the circulation section and aeration section 2. It is noted that the same volume and size relationship between the circulation section and aeration section, as defined above in connection wtih the apparatus of FIG. 1, is preferably maintained in this apparatus.

The wall $T_1$ is open in one area, as indicated in FIGURE 4, to permit fluid flow communication between the circulation section 1 and aeration section 2. A plurality of aeration devices 4 are shown located in the bottom of the aeration section 2. Continuous rotation of the carriage 5 and blade 3 causes horizontal flow of fluid in the aeration section 2 over the aeration devices 4 to enhance aeration of the fluid.

In order to minimize undesirable flow patterns characteristics from developing at the openings between the circulation section and aeration section 2, a threshold device 8 may be located, in a position, as indicated in FIG. 4 and extended transversely between the outer wall of the circulation section and the wall $T_1$. The device 8 may take the form of a mound or projection extending from the bottom of the circulation section 1 to above the mean surface level of the fluid in the circulation section, and may be provided with opposed curved surfaces as seen in end view in FIG. 6. The blade 3 may be provided with a roller 11, FIG. 6, and may be pivoted at its upper end to the carriage 5 as blade 3 passes over the mound 8 the blade 3 is raised by the roller 11. The roller 11 follows the left curved surface up to the peak of the mound 8 as the carriage moves to the right, as viewed in FIG. 6. A counterweight 7, FIG. 6, may be carried by the blade 3 so that as the blade starts to move down the right opposite curved surface, the weight 7 relocates the blade in its substantially vertical fluid moving position, as viewed in FIGURE 6. It will also be appreciated that more than a pair of spaced passage openings may be formed in the wall $T_1$ to provide fluid flow communication between the circulation section 1 and the aeration section 2 in order to combine two or more aeration stages in a single circular housing or building. With such an arrangement more than one threshold 8 may be employed.

If desired, an inner concentric sedimentation chamber 9, FIGS. 4 and 5, may be utilized which may be either a primary or secondary sedimentation basin. The scraper 10 usually employed in such sedimentation basins can be mounted for rotation on and with the carriage 5 for rotation with the blade 3, thereby simplifying construction and reducing power demands.

Figure 7:
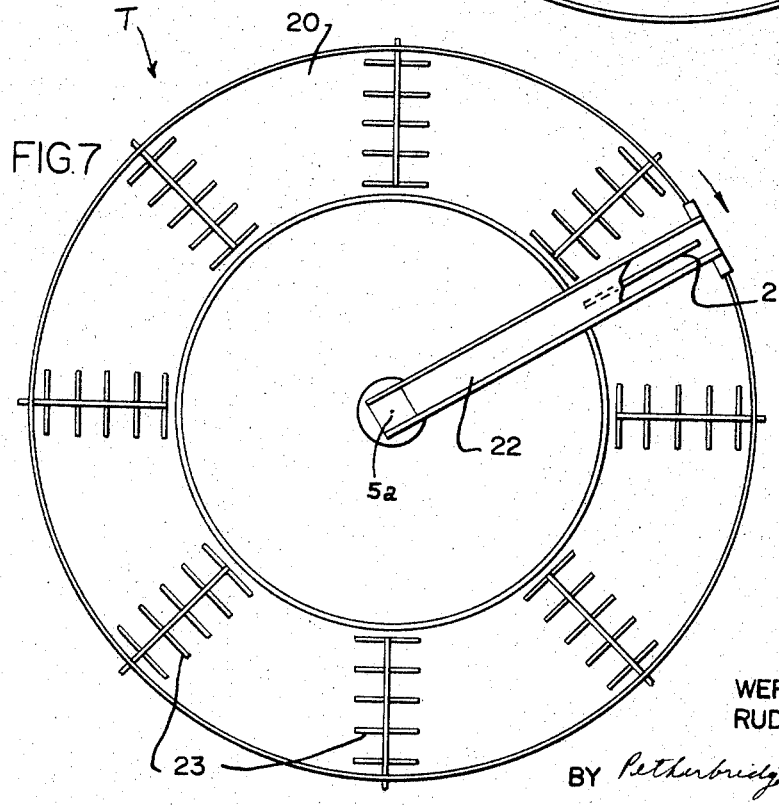
FIG. 7 is a top plan view of a fourth modification of the apparatus of the present invention, partially broken to facilitate description.

A particularly simple apparatus according to the present invention is shown in FIGS. 7 and 8. In this arrangement, a blade 21, similar in construction and operation to the carriage blade 3, is mounted on the rotatable carriage 22 for continuous rotation in a circular fluid channel 20. Aeration devices 23 are located in the bottom of this channel. In this arrangement, the liquid in the channel 20 is moved by the blade 21 in a horizontal direction over the aeration devices 23. While the hydraulic transmission phenomena produced in the flow rates between section 1 and aeration section 2 indicated in connection with the embodiments of FIGS. 1 to 6 is not produced, circular rotation of the blade is possible without the blade being required to be lifted over threshold devices, such as threshold device 8 of FIG. 4. Of course, the speed of the blade 21 in the apparatus of FIG. 7 must, therefore, be slightly higher, than the speed of the blade in the embodiments heretofore discussed. However, generally rotation speeds of 1 m./sec. are sufficient to obtain the required horizontal flow patterns and increased oxidation of the fluid in the channel 20.

If desired, the blade 21 need not be of substantially the same width as the channel 20. A blade of smaller width may be advantageously employed to produce a whirling movement through which introduced air bubbles are destroyed and consequently contact between liquid and air increased. It will also be noted that with this arrangement a primary or secondary sedimentation basin may also be provided in the center of the fluid channel such as the sedimentation basin.

We claim:
1. Apparatus adapted for the introduction of gases into liquids comprising:
   a tank having liquid therein and including walled means within the tank defining substantially continuous circulation and aeration sections, said aeration section having a cross sectional area substantially less than the cross sectional area of said circulation section;
   inlet and outlet means for feeding and removing liquid;
   passage means within the walled means communicating the aeration and circulation sections;
   blade means within the circulation section of substantially the same cross sectional area as that of the circulation section;
   power means adapted to actuate said blade means for traversing movement within the circulation section;
   aeration means within the aeration section for introducing the gas into the liquid.

2. Apparatus as set forth in claim 1, further including:
   a transverse threshold member extending transversely across said tank and above the liquid surface therein, said transverse member being located within the passage means;
   control means on said blade means to permit movement thereof over the threshold member.

3. Apparatus as set forth in claim 2, further including:
   carriage means mounted above said tank and adapted for rotational movement thereover, said blade means being attached to said carriage means and wherein said control means includes roller means mounted adjacent the bottom of said blade means and pivot means for pivoting of said blade means adjacent said carriage means to thereby permit passage of said blade means across the threshold member.

4. Apparatus as set forth in claim 2, wherein:
   said aeration and circulation sections are circular and concentric.

5. Apparatus as set forth in claim 3, further including:
   a sedimentation chamber within said tank having a bottom and side walls;
   scraper means mounted from within said carriage means and disposed in the bottom of said sedimentation chamber for collecting material for discharge through the outlet means.

6. Apparatus as set forth in claim 5, wherein:
   the speed of said blade means is controlled so that the flow rate of fluid in the aeration section is within the range of from 0.5 to about 1.5 meters per second.

References Cited

UNITED STATES PATENTS

| | | | |
|---|---|---|---|
| 1,247,540 | 11/1917 | Jones | 210—14 |
| 1,643,273 | 9/1927 | Imhoff | 210—14 X |
| 1,879,135 | 9/1932 | Downes et al. | 210—527 |
| 2,009,559 | 7/1935 | Mieder | 210—527 X |
| 2,723,760 | 11/1955 | Talbot | 210—530 |
| 3,215,276 | 11/1965 | Lind et al. | 210—220 X |
| 3,312,346 | 4/1967 | Walker | 210—220 X |
| 3,330,413 | 7/1967 | Danjes | 210—221 X |

FOREIGN PATENTS 729    1914    Great Britain.

REUBEN FRIEDMAN, *Primary Examiner.*

J. L. DE CESARE, *Assistant Examiner.*

U.S. Cl. X.R.

210—256, 527, 530